Dec. 9, 1969 R. J. KOERNER 3,483,528
CONTENT ADDRESSABLE MEMORY WITH MEANS FOR MASKING STORED INFORMATION
Filed June 20, 1966
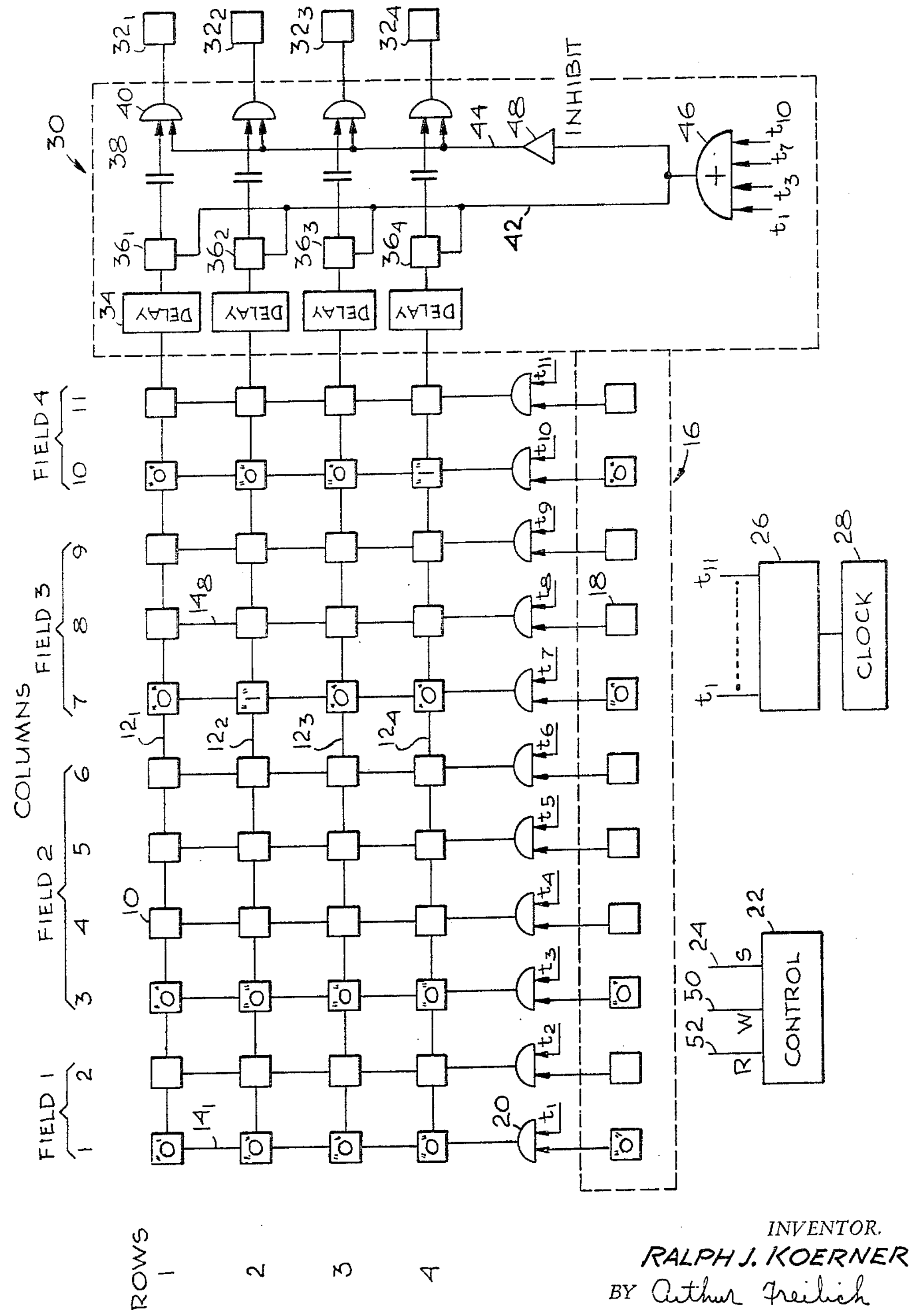
INVENTOR.
RALPH J. KOERNER
BY Arthur Freilich
ATTORNEY 3,483,528

CONTENT ADDRESSABLE MEMORY WITH MEANS FOR MASKING STORED INFORMATION

Ralph J. Koerner, Canoga Park, Calif., assignor to The Bunker-Ramo Corporation, Stamford, Conn., a corporation of Delaware Filed June 20, 1966, Ser. No. 558,757
Int. Cl. G11b *13/00*
U.S. Cl. 340—173 11 Claims

ABSTRACT OF THE DISCLOSURE

A content addressable memory system for simultaneously comparing a search word with a plurality of stored words. The search word bits are compared in sequence, each being compared with all of the stored word bits of corresponding significance. A mismatch signal is generated whenever the state of a search word bit differs from the state of the stored word bit with which it is compared. Means are provided for masking selected bits of selected stored words to thus inhibit the generation of mismatch signals with respect thereto.

This invention relates generally to digital memories and more particularly to improvements in content addressable memories.

U.S. Patent No. 3,031,650 discloses some basic content addressable memory implementations and discusses the characteristics which distinguish such memories from conventional digital memories. Briefly, the significant distinguishing characteristic is that each word location in a content addressable memory is not uniquely identified by an address as in conventional digital memories but instead content addressable memory locations are selected on the basis of information stored therein; i.e., the contents thereof. Hence, the name content addressable memory.

As a result of selecting locations on the basis of stored information, memory search times can be considerably reduced at the cost of some additional hardware. That is, in situations where it is desired to select those locations out of N locations in memory, storing words matching a search word, information identifying those locations can be derived in one memory access period instead of the N such periods required by conventional digital memories. More particularly, whereas it is necessary in a conventional digital memory to sequentially access the contents of each location and compare each accessed word with a search word, comparison of the search word with all of the stored words can be simultaneously effected in a content addressable memory.

Essentially, a content addressable memory operates by causing an interrogation signal representative of a search word bit to be applied simultaneously to all memory elements storing bits of corresponding significance. Some type of logic means is provided in the memory, such means being operable to generate signals to indicate whether the bits stored in the various memory elements are the same as or different from the corresponding search word bit being sought. All elements of a single memory word location are coupled to a common word line and by sensing resultant signals appearing on the word line, it can be determined whether the word stored in the memory location associated with that word line matches or mismatches the search word.

Whereas the content addressable memory embodiment disclosed in the aforementioned U.S. Patent No. 3,031,650 performs a search which considers all stored bits in parallel, as well as all stored words, U.S. patent application Ser. No. 269,009, now U.S. Patent No. 3,297,995 (the content of which is not necessary to the understanding of the present invention), filed Mar. 29, 1963, by Ralph J. Koerner and Alfred D. Scarbrough and assigned to the same assignee as the present application, discloses a content addressable memory embodiment which causes the bits of stored words to be considered serially or sequentially, while the words are still considered in a parallel fashion.

In virtually all types of content addressable memories, means are provided for masking certain bits of the search word. That is, instead of searching to locate a stored word all of whose bits match the search word bits, it is sometimes only desired to know those stored words which have a portion matching a corresponding portion of the search word. Thus, it may only be desired to know which stored words have bits 5–10 which match the corresponding search word bits, for example. In this situation, all of the search word bits, other than bits 5–10, are masked so that they do not initiate interrogation signals and thus cannot give rise to the generation of mismatch signals.

The present invention is based upon the recognition that it is sometimes desirable to mask certain portions of stored words rather than masking portions of the search word. More particularly, consider a word format consisting of several fields (e.g., four) which respectively represent different characteristics of a single item. For example, let it be assumed that each word includes information pertaining to a different automobile, with the four fields of each word respectively identifying the automobile make, license plate number, color, and year. If it is desired to locate all those words pertaining to automobiles of a particular make, color, and year, the second search word field can be masked and a search can then be conducted to determine which stored words have first, third, and fourth fields which identically match the corresponding fields of the search word. Suppose however, that the year of a particular automobile is not known and that the stored word describing it therefore contains no meaningful information in its fourth field. However, it may still be desirable to indicate such an automobile as matching the description of an automobile described by the search word if its make and color match the make and color specified by the search word. In order to do this, it is desirable to be able to mask a particular stored word field (herein, field four).

In view of the foregoing, and in accordance with a significant aspect of the present invention, a content addressable memory system and method of operation thereof is provided which enables fields of words stored in the memory to be masked so as to prevent those fields from affecting searches conducted through the memory.

In a preferred embodiment of the invention, the bits of a search word are utilized in sequence, each bit being simultaneously compared with all of the corresponding bits of the words stored in memory. All bits of the same stored word are coupled to a common word line which in turn is coupled to a binary match element whose state at the end of a search indicates whether the corresponding stored word matches the search word. In order to mask a field of a particular stored word, any mismatch signals developed on a word line while bits of a field to be masked are compared, are prevented from changing the state of the associated match element.

The novel features that are considered characteristic of this invention are set forth with particularity in the appended claims. The invention will best be understood from the following description when read in connection with the accompanying FIGURE 1 which is a block diagram of a system constructed in accordance with the teachings of the present invention.

Attention is now called to the figure which illustrates a block diagram of a content addressable memory system constructed in accordance with the present invention.

The system includes an essentially conventional content addressable memory matrix comprised of a plurality of memory elements 10 arranged in rows and columns. Although the matrix illustrated in the figure is comprised of four rows and eleven columns, it should be appreciated that any size matrix can be employed in accordance with the teachings of the present invention.

Each matrix row can be considered as a single memory location defining eleven different bit positions. All of the memory elements 10 of a single row are similarly coupled to a common word line 12. Thus, the elements of rows 1, 2, 3, and 4 are respectively coupled to word lines $\mathbf{12}_1$, $\mathbf{12}_2$, $\mathbf{12}_3$, and $\mathbf{12}_4$.

Correspondingly positioned memory elements 10 in different word locations are coupled to a common digit line. Thus, all of the memory elements 10 in column 1 of the matrix are coupled to digit line $\mathbf{14}_1$. Similarly, all of the memory elements 10 in column 8 of the matrix are coupled to digit line $\mathbf{14}_8$.

From what has been said thus far, it should be appreciated that each of the rows or word locations is capable of storing a word of eleven bits. In accordance with a basic objective of all content addressable memory systems, it is desirable to be able to simultaneously compare a search word with all of the words stored in the matrix. In accordance with the exemplary embodiment shown in the figure, a search register 16, comprised of eleven binary stages 18, is provided for storing a search word. The output of each search register stage 18 is coupled through a gate 20 to the digit line 14 of the corresponding matrix column.

In order to conduct a search through the memory to determine those stored words which match a search word stored in the register 16, a control means 22 defines a search mode by providing a true signal on its output terminal 24. In response thereto, a counter 26, driven by a clock pulse source 28, provides a series of output pulses $t_1$–$t_{11}$ which define successive time slots or time periods. During each of these time slots, a different one of the gates 20 is enabled to thus apply binary interrogation signals in sequence to the digit lines $\mathbf{14}_1$–$\mathbf{14}_{11}$. Each interrogation signal is of course, representative of the state of the corresponding search register stage 18. Each of the memory elements 10 is responsive to an interrogation signal applied thereto for developing a mismatch signal on the word line 12 to which it is coupled if its state does not match the state of the corresponding search word bit. Thus, it should be appreciated that each memory element 10 in effect performs an exclusive OR function in that it develops a mismatch signal only when its state and the state of the corresponding search word bit differ. Although various specific content addressable memory implementations are known in the art for performing the exclusive OR function mentioned, a particularly interesting implementation which is well suited to the teachings of the present invention is disclosed in the aforecited U.S. patent application Ser. No. 269,009.

Each of the word lines 12 is coupled, by a coupling means 30, to a different match element 32. Thus, word lines $\mathbf{12}_1$–$\mathbf{12}_4$ are respectively connected to match elements $\mathbf{32}_1$–$\mathbf{32}_4$. Each match element 32 comprises a binary circuit which can, for example, constitute a conventional flip-flop. In conducting a search, each of the match elements 32 is initially set to a match state. The appearance of a mismatch signal on a word line 12 coupled thereto will, however, switch it to a mismatch state. Thus, those elements 32 which still define a match state after all of the search word bits have been compared with all of the corresponding stored word bits, indicate those stored words which match the search word.

As previously pointed out herein, it is sometimes desirable to be able to mask, i.e., to exclude from a search, a certain portion or field of a particular stored word. More particularly, assume for example, that each word stored in the matrix pertains to a different item such as an automobile. Further, consider that columns 1 and 2 define a first field in which is stored information representing the make of the automobile. Let it further be assumed that field 2 is defined by columns 3, 4, 5, and 6 and is used for storing information identifying a license plate number. Let it further be assumed that field 3 is defined by columns 7, 8 and 9 and stores information representing the color of the automobile. Further, let it be assumed that field 4, comprised of columns 10 and 11, stores information representing the automobile's year of manufacture.

In utilizing the system illustrated in the figure, suppose it is desired to ascertain the license plate numbers of all automobiles of a particular make, color, and year. In order to do this, it is necessary to locate those words which contain fields 1, 3, and 4 which match the characteristic of the automobile being sought. In order to do this, information describing the automobile characteristics being sought, is entered into the search register 16. Thus, information representing the automobile make is entered into bit positions 1 and 2 of the search register 16, information representing the color entered into bit positions 7, 8 and 9 of the search register 16, and information representing the year is entered into bit positions 10 and 11. A search can then be conducted through the memory which compares the search word bits with the stored word bits. Inasmuch as the license plate number information is not to be compared, it is, of course, necessary to mask bit positions 3–6 of the search register 16. Many techniques for masking portions of the search register are discussed in the prior art and will not be considered in detail here. Suffice it to say, that the signals defining time slots $t_3$–$t_6$ can be suppressed thereby preventing interrogation signals from being applied to digit lines $\mathbf{14}_3$–$\mathbf{14}_6$ to thus prevent memory elements 10 in these columns from developing mismatch signals. As a consequence of the search, mismatch signals will be developed on all those word lines associated with words whose fields 1, 3 and 4 do not match the corresponding fields of the search word.

The present invention is directed to a problem which primarily arises as a consequence of the stored description of an item being incomplete. For example, let it be assumed that when the words describing the automobiles were initially stored in the memory, the year of a particular automobile was not known. Therefore, the word stored in the memory describing that particular automobile will not contain meaningful information in its fourth field. However, in conducting a search to locate those automobiles of a particular make, color, and year, it is desirable that the system also locate the automobile whose record is incomplete if its make and color match the make and color of the auomobile defined by the search word. In other words, where it is known that a portion or field of a word does not contain meaningful data, it is desirable to mask that field so it does not give rise to mismatch signals which indicate that the whole word does not match the search word. In accordance with the present invention, the first bit position of each field (which may hereinafter be referred to as the mask field position) will be used to define whether the field should be masked. If the field is to be masked, then the word line 12 is effectively decoupled from the match element 32 while the bits of that field are being compared.

In order to implement the concept of the invention, all of the initial bit positions in each field in the search register 16 define a first state, e.g., "0." Thus, assuming the field configuration mentioned, "0's" are stored in each of search register stages 1, 3, 7 and 10. A "1" is stored in the initial bit position of each field to be masked. Thus, assume, for example, that field 3 of word location 2 is to be maksed and field 4 of word location 4 is also to be masked. Thus, a "1" is stored in the memory element 10 at the intersection of row 2 and column 7 and a "1" is also stored in the memory element 10 at the intersection of row 4 and column 10.

Prior to considering the detailed operation of the system illustrated in the figure, it is necessary to explain in greater detail the nature of the means 30 coupling each of the word lines 12 to a match element 32. Each of the word lines 12 is connected to a delay device 34 which in turn is connected to a sense element 36 which comprises a binary element such as a conventional flip-flop. The output of the sense element 36 is AC coupled, as through a capacitor 38, to the input of an AND gate 40. The output of each AND gate 40 is connected to the input of a different match element 32. A reset conductor 42 is connected to a reset input terminal of all the elements 36. An inhibit conductor 44 is connected to the input side of each of AND gates 40.

In order to conduct a search, all of the match elements 32 and sense elements 36 are initially switched to a match state. Then, in response to the initial mismatch signal appearing on any of the word lines 12, the sense element 36 coupled thereto will switch from the match to a mismatch state. This action will be coupled through capacitor 38 to also switch the corresponding match element 32 to a mismatch state unless the gates 40 are concurrently inhibited or disabled.

In view of the foregoing, it should be appreciated that whenever the initial bit position in a stored word field is a "1" indicating the field is to be masked, a mismatch signal will be developed on the associated word line when it is interrogated. Thus, when the memory element at the intersection of row 2 and column 7 is compared with the corresponding bit of the search register 16, a mismatch signal will be developed on the word line $12_2$. Assuming that the sense element 36 was still in a match state when this comparison occurred during time slot $t_7$, the mismatch signal developed will switch the sense element $36_2$ to a mismatch state. In order to prevent the corresponding match element 32 from switching to the mismatch state, an OR gate 46 will provide a true output signal through inverter 48 to the inhibit line 44 to thus disable gates 40 accordingly preventing any mismatch signals developing during time slot $t_7$ from affecting the states of match elements 32. It should be noted that the OR gate 46 will provide a true output signal during each of the time slots corresponding to the interrogation of the initial bit position in each of the fields.

By switching the sense element $36_2$ to a mismatch state in time slot $t_7$ while preventing the corresponding match element $32_2$ from switching to the mismatch state, assurance is had that the match element $32_2$ will ignore subsequent comparisons between search and stored word bits in that field inasmuch as the match element 32 can switch to a mismatch state only in response to the associated sense element switching to a mismatch state. After all of the bits in the field being masked have been compared, it is necessary to switch the sense elements 36 back to a match state prior to the interrogation of a subsequent field. Thus, whereas it is desired to mask the third field of the word stored in row 2, it is not desired to mask the fourth field of that word. Accordingly, it is necessary to reset or switch the sense element 36 back to a match state prior to the development of any mismatch signal from a subsequent field. In order to do this, the output of OR gate 46 is connected to conductor 42 which, as has been noted, is connected to the reset input terminals of sense elements 36. The delay device 34 assures that the mismatch signal developed by the initial bit in each field will not be applied to the sense element 36 prior to their being returned to the match state by the output of OR gate 46.

From the foregoing, it should be appreciated that the content addressable memory system shown in the figure can be employed to mask selected stored word fields in order to prevent such fields from bearing upon the search results. As has been previously pointed out herein, the details of implementation with respect to various elements such as memory element 10, match elements 32, and sense elements 36, have not been set forth herein inasmuch as a multitude of different implementations would be consistent with the concepts of the present invention and because various implementations are discussed elsewhere, e.g., the aforecited U.S. patent application Ser. No. 269,009. Similarly, no mention has been made herein with respect to the manner in which information is written into or read from the search register 16 and word locations of the matrix. Suffice is to say that the control device 22 is able to provide a control signal on write conductor 50 in order to write selected information into a specified memory location and similarly the control means 22 is able to provide a control signal on read conductor 52 to access the contents from any word location. It is important that the specific field configuration shown in the figure is not hardware determined. That is, the field configuration is determined only by the inputs to OR gate 46 and the corresponding storage position of the mask field bits. It is also pointed out that although a counter 26 has been specifically illustrated for defining the time slots, it is recognized that other implementations can be utilized. For example, each timing signal can be caused to occur a fixed interval after a preceding timing signal.

The embodiments of the invention in which an exclusive property or privilege is claimed are defined as follows:

1. In a content addressable memory including means storing a multifield search word and a plurality of multifield stored words, each field being comprised of one or more bits, and means for successively comparing the bits of said search word with the corresponding bits in all of said stored words to develop mismatch signals on word lines each uniquely associated with a different one of said stored words whenever the compared search word bit and stored word bit do not match, means for masking fields of said stored words comprising:

a plurality of binary sense elements, each coupled to a different word line and each responsive to a mismatch signal appearing on the word line coupled thereto for switching to a mismatch state;

a plurality of binary match elements each associated with a different one of said sense store elements;

gating means responsive to each of said sense elements switching to a mismatch state for switching the associated match element to a mismatch state;

means establishing a first state in the initial bit position of each search word field and a second state in the initial bit position of each stored word field to be masked to thus cause a mismatch signal to be developed whenever the initial bit position of a field to be masked is compared;

means for establishing a match state in said sense elements prior to the development of a mismatch signal resulting from a comparison involving initial bit positions of a field; and means for inhibiting said gating means coincident with the development of mismatch signals resulting from a comparison involving initial bit positions of a field.

2. In a content addressable memory including means storing a multifield search word and a plurality of multifield stored words, each field being comprised of one or more bits, and means for successively comparing the bits of said search word with the corresponding bits in all of said stored words to develop mismatch signals on word lines each uniquely associated with a different one of said stored words whenever the compared search word bit and stored word bit do not match, means for masking fields of said stored words comprising:

a plurality of binary match elements each capable of defining a match and a mismatch state;

a plurality of coupling means each coupling one of said word lines to a different one of said match elements for switching said match elements to a mismatch state in response to the development of a mismatch signal thereon;

means establishing a first state in the initial bit position of each search word field and a second state in the initial bit position of each stored word field to be masked to thus cause a mismatch signal to be developed whenever the initial bit position of a field to be masked is compared; and means responsive to a mismatch signal developed when the initial bit position of a field is compared for disabling the coupling means associated therewith with respect to all bit positions of that field.

3. The memory of claim 2 wherein said means coupling each of said word lines to each of said match elements includes a binary sense element responsive to a mismatch signal on the word line to which it is coupled for switching to a mismatch state;

gating means responsive to said sense element switching to a mismatch state for switching the match element coupled thereto to a mismatch state; and means for disabling said gating means when one of said initial field bit positions is compared.

4. A method of operating a content addressable memory to compare a plurality of multibit stored words with a multibit search word and for masking selected bits of said stored words, said method including the steps of:

defining successive time periods;

comparing during each of said time periods a different one of said search word bits with all of the corresponding stored word bits to develop a mismatch signal wherever a stored word bit does not match the corresponding search word bit;

storing for each of said stored words a mismatch signal developed by a bit thereof; and inhibiting said storing of mismatch signals during those time periods in which said bits to be masked are compared.

5. A content addressable memory system comprising:

means storing a multibit search word;

means storing a plurality of multibit stored words;

means for masking selected bits of selected stored words; and means for comparing each of said search word bits simultaneously with all corresponding stored word bits which are not masked.

6. The memory system of claim 5 wherein said bits are arranged in fields, each stored word field including an initial bit indicating whether or not the bits of that field should be masked; and means responsive to the initial bit in each of said stored word fields for controlling said means for masking.

7. The memory system of claim 5 wherein said search word bits are compared in sequence.

8. A content addressable memory system comprising:

a matrix of bit memory elements arranged to define a plurality of locations each capable of storing a multibit word;

a plurality of word lines each coupled to all of the memory elements of a different one of said locations;

means storing a multibit search word;

means defining a plurality of successive time periods;

means for comparing a different search word bit during each of said time periods with the corresponding bits in all of said stored words to develop mismatch signals on those word lines coupled to memory elements storing bits which do not match the search bit compared therewith;

a plurality of binary match elements each capable of defining a match or a mismatch state;

a plurality of coupling means each coupling one of said word lines to a different one of said match elements for switching said match element to a mismatch state in response to the development of a mismatch signal thereon;

means identifying fields to be masked in said stored words; and means for disabling the coupling means associated with each of said fields to be masked with respect to all bit memory elements of those fields.

9. The system of claim 8 wherein each of said coupling means includes a binary sense element responsive to a mismatch for switching to a mismatch state;

gating means responsive to said sense element switching to a mismatch state for switching the match element coupled thereto to a mismatch state; and wherein said means for disabling includes means for disabling said gating means.

10. The system of claim 8 wherein said means identifying fields to be masked includes means for developing a mismatch signal in response to a comparison involving the initial bit memory element of each field to be masked.

11. The system of claim 9 wherein said means identifying fields to be masked includes means for developing a mismatch signal in response to a comparison involving the initial bit memory element of each field to be masked; and means for switching said binary sense elements to a match state prior to comparing the initial bit in any of said fields.

References Cited

IBM Technical Disclosure Bulletin, vol. 3, No. 10, March 1961. Associative Memory by F. Rosin, pp. 120–122.

MERRELL W. FEARS, Primary Examiner

U.S. Cl. X.R.

340—172.5